US005949780A

United States Patent [19]
Gopinath

[11] Patent Number: 5,949,780
[45] Date of Patent: Sep. 7, 1999

[54] INTEGRATION OF INTELLIGENCE WITH COMMUNICATIONS IN A SWITCHING NODE

[75] Inventor: Bhaskarpillai Gopinath, Watchung, N.J.

[73] Assignee: Network Machines, Inc., Piscataway, N.J.

[21] Appl. No.: 08/891,714

[22] Filed: Jul. 11, 1997

[51] Int. Cl.⁶ .............................. H04L 12/28; H04L 12/56

[52] U.S. Cl. .............................. 370/389; 370/401; 710/1

[58] Field of Search ..................................... 370/389, 401, 370/400, 402, 403, 404, 409; 710/1, 22, 23

[56] References Cited

U.S. PATENT DOCUMENTS 5,633,924  5/1997  Kaish et al. ............................. 379/266

OTHER PUBLICATIONS

Bhattacharjee et al., "On Active Networking and Congestion", Georgia Institute of Technology Technical Report, GIT–CC–96/02, Jan., 1996.

*Primary Examiner*—Hassan Kizou
*Assistant Examiner*—Mitchell Slavitt
*Attorney, Agent, or Firm*—John T. Peoples

[57] ABSTRACT

A canonical programming method for integrating intelligence into a communications service at a switching node. The communications service is implemented with a program stored in a processing unit which receives and transmits messages from and to ports, respectively. Each incoming message, which includes a control part and a payload part, is parsed to determine if a modification is required. If no modification is required, a message corresponding to the incoming message is transmitted to one or more of the ports. If modification is required, then the message is further processed with the stored program to produce program-generated events and subsequent actions which thereby engender the intelligent communications service.

10 Claims, 4 Drawing Sheets

INTEGRATION OF INTELLIGENCE WITH COMMUNICATIONS IN A SWITCHING NODE

BACKGROUND OF THE DISCLOSURE

1. Field of the Invention

This invention relates generally to communications, and, more particularly, to methodologies and concomitant circuitry for coalescing intelligence with communications in a switching node.

2. Description of the Background

Historically, a public telecommunications service was generally supported by a geographically-dispersed, circuit-switched network composed of a cascade of communication paths and switches having stored but static programs (called "generic" programs) for switching the communication paths to thereby establish an end-to-end connection—the essential function of the paths and switches was that of merely establishing this end-to-end connection.

Recently, services have been made "intelligent" in the sense that establishing a service is more than merely establishing a connection via the cascade of paths and switches. Such services have been achieved by associating intelligence with the switches. To exemplify one service, consider a customer placing a telephone call that requires special handling, such as a toll-free call (800 service). The call is intercepted by a local switching system which launches a query through a signaling network to a centralized database located in a centralized processor. The database, in turn, retrieves the necessary information to handle the call, and performs a number translation to map the "logical" 800 number to a "physical" routing number. The physical routing information is returned through the signaling network to the local switching system so that the call can be completed.

Even more recently, the notion of "active networking" has been introduced; active networking is intended to effect an even more significant change on the historical network paradigm, namely, a change from a passive carrier of analog/digital signals to a more general computational ability associated with network components, especially the switches. However, such efforts to this point in time have been devoted more to outlining the benefits that such a paradigm could achieve, without elucidating specifics of such an approach except in a few special cases.

For example, the paper entitled "On Active Networking and Congestion" as authored by Bhattacharjee, Calvert, and Zegura (BCZ) in January, 1996 and published as Georgia Institute of Technology Technical report GIT-CC-96/02, focuses on applying active networking concepts to handling network congestion. In BCZ, the model of what happens when a packet arrives at a node (used interchangeably with switch) is as follows—for the sake discussion, a packet is composed of a header part and a payload part:

(1) The output destination port for the packet is computed as usual.

(2) If a packet contains a valid Active Processing Function Identifier (ACPI), it is sent to an active processor and processing continues; otherwise, it is transmitted as usual.

(3) The function specified in the ACPI is computed, using the packet's association descriptor and user data as inputs.

(4) If the result of the function is transformed data (e.g., reduced length), the packet's network-level header and ACPI are recomputed as necessary; the node's state is updated as required by the specified function.

(5) The (possibly modified) packet is transmitted to its next-hop node.

It is extremely important to reiterate that the above procedure requires an Active Processing Function Identifier (ACPI) to differentiate between conventional processing and additional, that is, active processing. As BCZ further point out, the obvious place to put the ACPI is in the same header used to switch the packet. However, BCZ concludes that such an approach is unacceptable for at least two reasons. First, the approach does not work for ATM or any other technology where the switched unit is too small to accommodate additional overhead of the ACPI. And second, the approach is not backward-compatible, requiring that all network protocols become "active-aware". BCZ proposes that an alternative to placing the ACPI in the network header itself is to define a "generic" location for the ACPI function, sufficiently high in the protocol stack that the additional processing overhead is not prohibitive, but sufficiently low in the protocol stack to allow its location by switching nodes without too much knowledge of higher-level protocols. Thus, BCZ immediately rules out the use of the packet itself for differentiating between conventional and active processing. However, use of the packet (either the header, payload, or both) overcomes what BCZ deems to be unacceptable, that is, use of the packet itself eliminates additional packet overhead, and network protocols need not be "active-aware".

Moreover, the prior art is devoid of teachings or suggestions related to program execution in the switch based upon the following actions/events (an event triggers an action which, in turn, generates a desired response): the state of the program itself; the state of resources composing the switch; external control inputs serving the switch; other programs executing in the switch; data (packets) received over other ports of the switch; or combinations of these actions/events. In addition, there is no teaching or suggestion in the prior art wherein a new program can be downloaded to the switch, and then this new program can be executed, in conjunction with other stored programs if necessary, based upon data incoming to a port as well as any or all the foregoing actions/events. Finally, the prior art lacks any teachings or suggestions for executing a "guard" program, either stored or downloaded, to control execution of "guarded" programs to thereby preclude inconsistent configurations of the switch.

SUMMARY OF THE INVENTION

Shortcomings and limitations of the prior art are obviated, in accordance with the present invention, by methodologies and concomitant circuitry wherein, generally, intelligence and communications coalesce in a switching node under control of a canonical programming technique to effect a communications service.

Broadly, in accordance with one aspect of the present invention, a communications service is implemented with a program stored in a processing unit having input and output ports to receive and transmit messages—each message is composed of, canonically, a control tag and payload information. For each port, data is retrieved and then parsed by the program to determine if the control tag and/or the payload information is to be modified. Based upon the parsing, the incoming message can be sent to one or more other ports, or further processed by the program or other stored programs to produce desired actions.

Broadly, in accordance with another aspect of the present invention, a canonical programming method for integrating intelligence into a communications service includes: (1)

implementing the communications service with a program stored in a processing unit having: a program memory including a program state; a resource state memory for storing the states of resources serving the processing unit; and input/output ports to receive and send messages, respectively; and (2) executing the program in response to a specific message accessed by the program over a corresponding port. The step of executing includes the steps of: (a) accessing the specific message, (b) parsing the contents of the specific message, (c) determining the program state and the resource state, and (d) effecting a response based upon the contents of the specified message, the program state, and the resource state. Such a response would, for example, include sending one or more messages to other ports, changing the program state and/or the resource state, or sending a message to another stored program and awaiting a result.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized to bind intelligence with communications in a switching node to thereby engender an intelligent communications service.

The description commences with an elucidation of a high-level block diagram illustrative of an intelligent communications service implement at a switching node.

Figure 1:
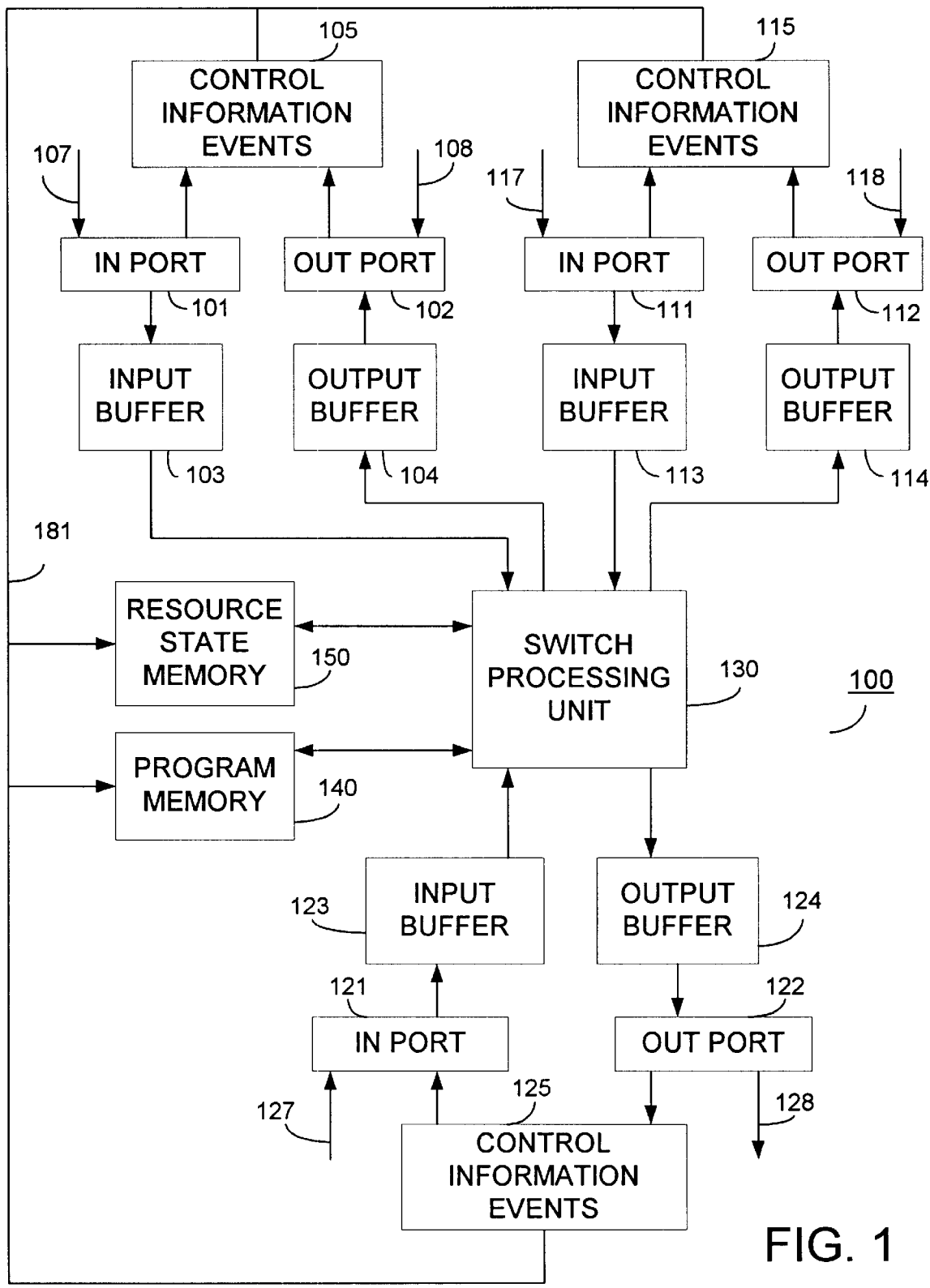
FIG. 1 depicts a high-level block diagram of a switching node implemented by a processing unit having at least one stored program in a program memory.

With reference to FIG. 1, switching system 100 is composed of the following components: (a) input ports 101, 111, 121, . . . ; (b) output ports 102, 112, 122, . . . ; (c) switch processing unit 130; (d) input buffers 103, 113, 123, . . . interposed between input ports 101, 111, 121, respectively, and switch processing unit 130; (e) output buffers 104, 114, 124, . . . interposed between output ports 102, 112, 122, respectively, and switch processing unit 130; (f) program memory 140 coupled to switch processing unit 130; (g) resource state memory 150 coupled to switch processing unit 130; and (h) control information event buffers 105, 125, 125, . . . wherein, for example, control buffer 105 is coupled to input port 101 and output port 102, and so forth. In addition, bus 181 couples all control information buffers 105, 115, 125, . . . to program memory 140 and resource state memory 150. Finally, for example, input link 107 couples an external source (such as another switching system similar to system 100) to input port 101, output link 108 couples output port 102 to an external destination (such as another switching system similar to 100), and so forth.

Examples of resources include: input buffer (103, 113, 123) and output buffer space (104, 114, 124); buffer space for each connection through the system 100; bandwidth assigned to each connection through system 100. Accordingly, resource state memory 150 would include: connection state information per each connection through system 100, such as routing information, buffer memory size and location, statistics per connection (e.g., number of messages transferred in a given time period)—such information is typically stored in a so-called "look-up" table which is indexed with reference to information in the incoming control tag of the message.

Control information is provided, for example, by internal timers, or information derived from external systems such as a network management system (not shown). The management system may require that messages having certain patterns be dropped from further processing by system 100.

Switch processing unit 130 is any commercial microprocessor (such as RISC MIPS 4700).

Switching system 100 is autonomous in that the only interconnection to external source systems or destination systems is via the input links (107, 117, 127, . . . ) and output links (108, 118, 128, . . . ), respectively. Control information arriving from an external system is passed to a desired control information buffer via a path composed of ports, buffers, and switch processing unit 130 (e.g. to buffer 105 via a path composed of incoming link 107, input port 101, input buffer 103, switch processing unit 130, output buffer 104, output port 102, thereby arriving at buffer 105). Similarly, control information destined for an external destination system from, say buffer 105, traverses a path composed of input port 101, input buffer 103, switching unit 130, output buffer 104, output port 102, and outgoing link 107.

Switching system 100 is arranged with the following properties:

(1) receive messages (e.g., packets or cells) from external data inputs—for example, over link 107 via input port 101 and input buffer 103. The messages can be fixed or variable in length, and a data message is composed of control tag (e.g., header) and data information (e.g., payload).

(2) switch processing unit 130 can receive control information (e.g., timer information) from control information buffers 105, 115, 125, . . . as carried by bus 181.

(3) the state of resources (e.g., buffer queues) is stored in resource state memory 150 which is bi-directionally coupled to switch processing unit 130.

(4) programs are stored upon system initialization in program memory 140, including executable code and corresponding data as well as the states of the programs (e.g., executing, stand-by); programs can be downloaded dynamically into program memory 140 through switch processing unit 130 via data messages, and the programs can control or be controlled by control information buffers 105, 115, 125, . . . .

(5) programs that are stored can be executed from program memory 140 in switch processing unit 130.

(6) response events (e.g., change header, payload, or both, or send a message to another program and await response) result from program execution.

(8) new or modified messages result from program execution.

(9) resource states stored in resource memory 150 may be changed as the result of program generated events.

(10) programs stored in program memory 140 may be changed as the result of program generated events.

(11) data messages may be received from external input(s) may be sent to one or more external output(s) after optionally modifying the content of the control tag and/or data information (e.g., header and/or payload) of an incoming data message.

(12) data messages may be generated internally (e.g., as a result of program generated events) and then be sent to external output(s).

(13) data messages may be sent to the control information buffers as a result of program generated events.

(14) the control tag and the data information in a message may be non-disruptively observed.

(15) the program memory state and resource state memory may be determined.

(16) program execution of programs stored in program memory may be spawned upon:
  (a) arrival of a data message
  (b) arrival of control information at the control information buffers
  (c) change of any resource state
  (d) events generated by program execution
  (e) any combination of the above.

In addition, programs stored in program memory 140 are classified as either "guard" programs or "guarded" programs. A guard program controls accesses to program memory 140 and/or resource state memory 150 and establishes relationships between programs. Program-generated events that affect the resources or programs are processed by the guard program(s) to ensure no inconsistent states and/or events are generated upon program execution. An example of an condition to be guarded against is an unauthorized "write" into a resource memory (e.g., a routing table). Accordingly, a guard program has oversight responsibility to preclude a guarded program, or more generally, a set of simultaneously active guarded programs, from damaging the node state or attempting to produce an inconsistent node state (e.g., program memory and/or resource state memory). Examples of guard programs include network management, routing, and signaling programs. Examples of guarded programs include memory update, memory overwrite, and buffer management programs.

Figure 2:
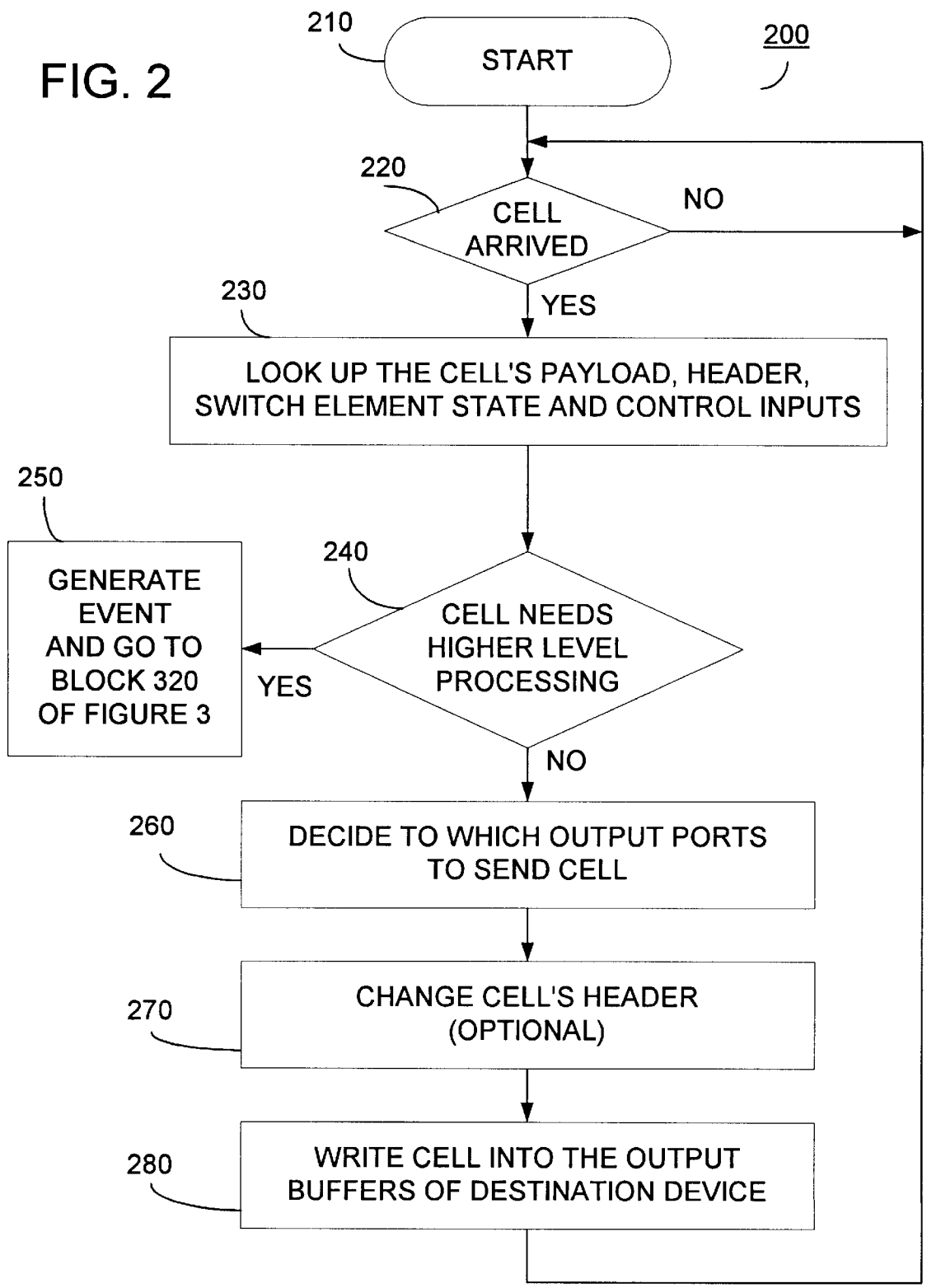
FIGS. 2–4 depict a high-level flow diagram for processing an incoming message by a program stored in the switching node.
Figure 3:
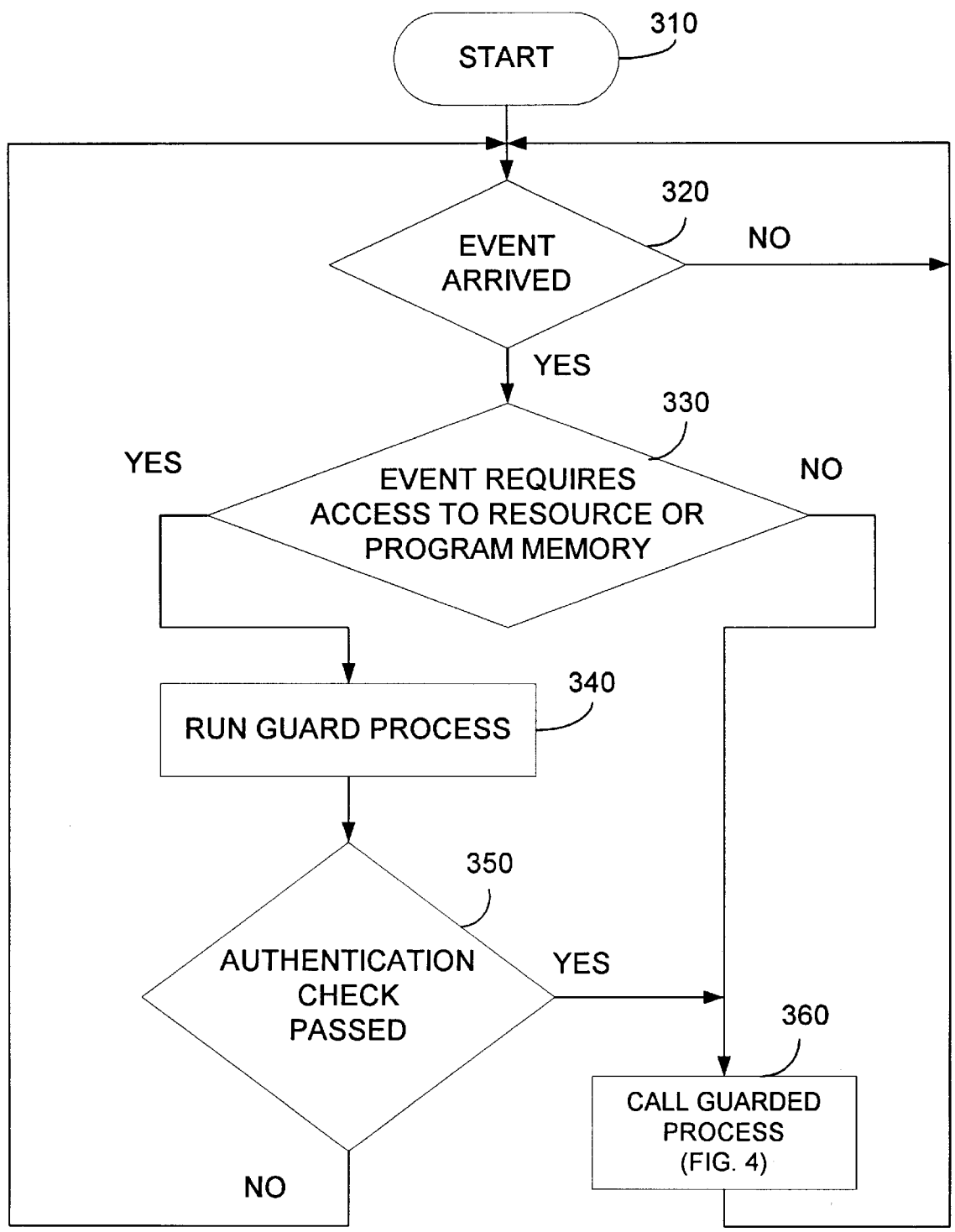
Figure 4:
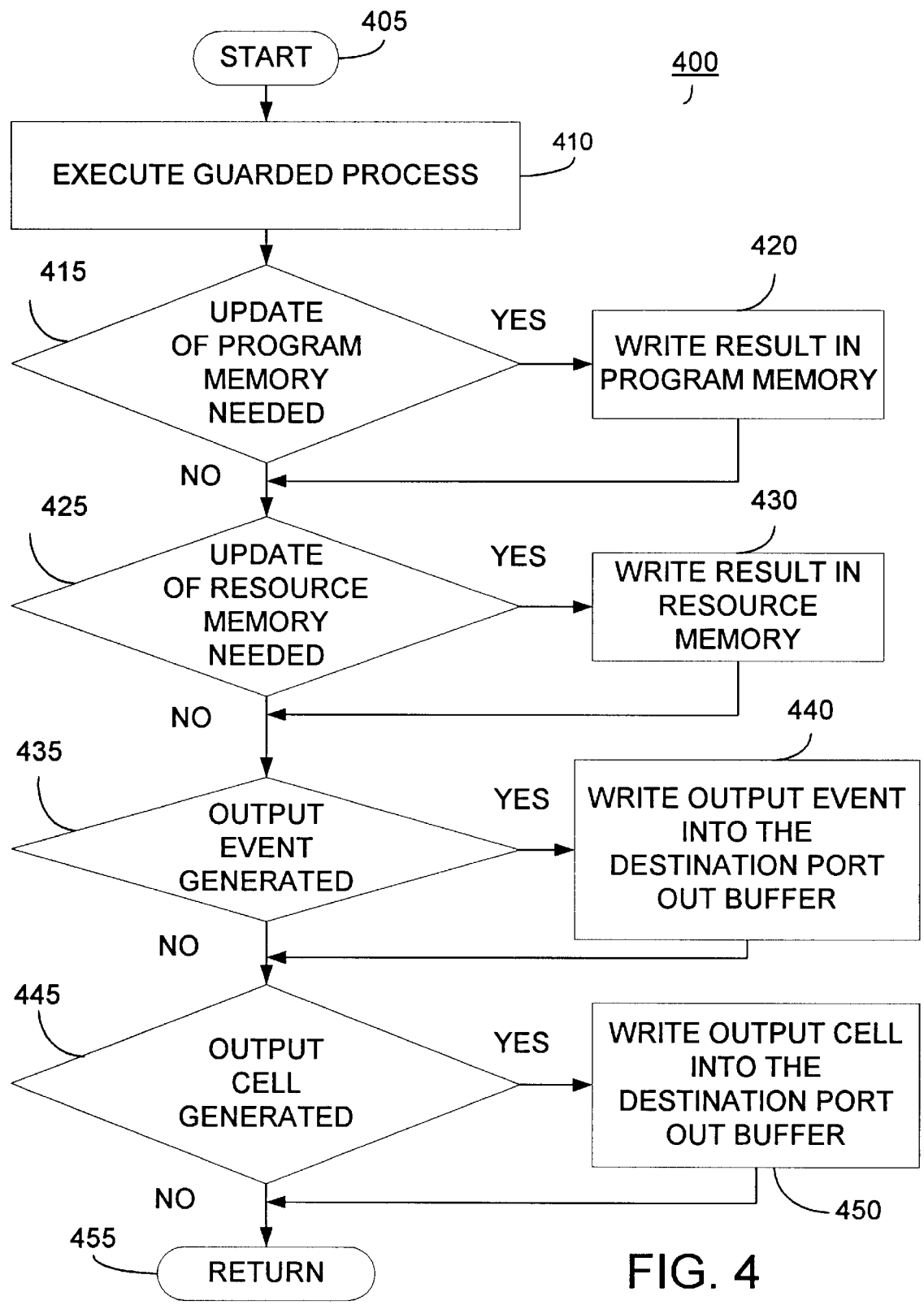

Flow diagram 200 of FIGS. 2–4 depict an illustrative flow for processing an incoming message retrieved by a specific port—for the sake of concreteness, but without loss of generality, an incoming message is referred to as a cell having a header and a payload (e.g., an ATM cell). Other ports can be concurrently processed in a similar manner. For the flow diagrams, processing of a message taken from input buffer 103 is considered as exemplary.

With reference to FIG. 2, after initialization (such as program start-up and sanity checks) as depicted by processing block 210, the cell processing program stored in memory 140, via decision block 220, monitors buffer 103 for an incoming cell. If no cell has arrived, then processing block 220 is re-invoked. Upon the arrival of a cell, the header, payload, the state of the node (that is, the state of resource state memory 150 and program memory 140), and any control inputs via control information buffers 107, 117, 127 are evaluated by processing block 230. Based upon the evaluation, processing by decision block 240 either sends the cell to processing block 260 if no higher-level processing is required, or to processing block 250 if higher-level processing is required.

In processing block 260, a determination is made as to which output ports are to receive the cell. Then processing block 270 is invoked to change the cell's header, if required. The cell is then sent to the output buffers of the destination ports via the processing by block 280. The control program then returns processing to block 220 to await another cell.

If higher-level processing is required, processing block 250 generates an appropriate event and processing continues at processing block 310 of FIG. 3. The flow of FIG. 3 commences with a check by decision block 320 as to whether or not an event has arrived. If not, decision block 320 is re-entered to await an event.

If so, the decision block 330 is invoked to determine if program memory 140 or resource state memory 150 is to be accessed. If not, then processing block 360 is entered to call for the execution of a guarded process—this processing flow is as set forth in FIG. 4, and will be described shortly.

If so, then processing block 340 runs an appropriate guard process as stored in program memory 140. Upon execution of the guard process, decision block 350 is entered to determine if an appropriate authentication check is satisfied. If not, then processing block 320 is re-invoked to await another event.

If so, then processing block 340 is invoked to call for execution of the guarded process of FIG. 4. After execution of the guarded process, invoked by the result of decision blocks 330 or 350, then decision block 320 is re-entered to await another event.

Now with reference to flow diagram 400 of FIG. 4, after system initialization occurs as represented by start block 405, the processing commences with the execution of guarded process as depicted by processing block 410—the guarded process is stored in program memory 140. After execution of the guarded process by block 410, decision block 415 is entered to determine if an update is required in program memory 140. If so, the result is written into program memory 140, and processing by decision block 425 is invoked; decision block 425 is also invoked if program memory 140 does not require updating.

Decision block 425 is used to determine if resource state memory 150 is to be updated. If so, the result is written into resource state memory 150, and processing by decision block 435 is invoked; decision block 435 is also invoked if resource state memory 150 does not require updating.

Decision block 435 is entered to determine if a output event is to be generated. If so, the event is written into the output buffer of the destination port, as depicted by processing block 440, and then decision block 445 is entered. Also, if no output event is required, processing proceeds directly from decision block 435 to decision block 445.

Decision block 445 is invoked to determine if an output cell is to be produced. If so, then the output cell is written into the output buffer of the destination port, as shown by processing block 450. If no output cell is to be generated, or upon the completion of processing by block 450, then execution control is returned to processing block 360 of FIG. 3.

Illustrative Example

As an aid to further elucidating interplay between the elements of system 100 and the flow diagrams of FIGS. 2–4, an example of a service—called "channel switching"—integrating intelligence with communications at a switching node is as follows.

It is assumed that the data message in the example is a cell having a header and a payload. The header includes incoming routing information. It is further assumed that if the value of the routing information is below a pre-determined value, no active processing is required on the cell; on the other hand, if the routing information is greater than or equal to the pre-determined value, then active processing is required. Whenever active processing is required, then the payload contains, at pre-determined locations, a program identifier, parameters to be passed to the program. For channel switching, one parameter is the output port to which the incoming cell is to be switched and another parameter is an authentication identifier for the user.

With the focus now on a given incoming cell, it is presumed that the cell's header has routing information greater than the pre-determined value. Accordingly, the program identifier is passed to the program memory 140 to call for the execution of the channel switching program stored in memory 140; at the same time, the parameters, including the desired output port and authentication identifier, are also passed to the channel switching program. It is further assumed that the channel switching program is a guarded program, so it will be necessary to execute a guard program first. The guard program in this example is one that compares the authentication identifier with a list of authorized authentication identifiers to ensure that the incoming authentication identifier is valid; the authentication list is stored, for example, in resource memory 150. Accordingly, the execution of the guard program is invoked initially (e.g., from the channel switching program) to test the authentication identifier.

Assuming that the authentication is valid, then execution of the guarded program can proceed. A look-up table, stored in resource memory 150, is accessed with reference to the routing information, and the outgoing port in the look-up table is overwritten with the new output port conveyed by the parameter in the payload.

By way of extending the example so as to show the use of control information manifested by control buffers 105, 115, 125, . . . , it is further supposed that one type of control information is a timer. Moreover, it is assumed that if the timer is within a prescribed range, then the channel switching program can be executed; otherwise, the channel switching program is precluded from executing and the payload information is ignored.

With reference to FIG. 2, the description of the flow of the channel switching example through the flow diagrams of FIGS. 2–4 commences at block 220. The incoming cell has arrived with a header and payload indicating channel switching is desired, and processing by block 230 is then invoked.

First, suppose that the timer value (a control input to the processing) is such that the channel switching program is precluded from executing, that is, the outcome of the combination of processing by blocks 230 and 240 results in "NO", so processing block 260 is next invoked (processing by this blocks 260, 270, and 280 may be considered the path of "conventional" processing of the data message/cell). In processing block 260, look-up table is accessed to determine the output port or ports (for multicasting) to which the cell is to be sent. Processing block 270 is invoked to change the cell's header, if needed, (for example, routing information is changed as per the contents of the look-up table), and finally the cell is written into the appropriate output buffers.

Second, suppose that the timer value is such that the channel switching program may proceed with its execution, that is, the result of processing by blocks 230 and 240 is "YES". Processing block 250 generates an event which, in turn, triggers an action to continue with program execution in processing block 320 of FIG. 3. Decision block 320 yields a "YES" since an event has arrived from processing block 250. Decision block 330 is invoked to determine if resource memory 150 or program memory 140 are to be accessed; in this case, since authentication is required before the guarded process can further execute, resource memory 150 is accessed for the contents of the authentication list, and program memory 140 is accessed for the guard program (i.e., the authentication program). As evidenced by processing block 340, the guard program is executed to test the validity of the authentication identifier. Processing block 350 is invoked to check on the outcome of the validity test. It is supposed that the authentication identifier is valid, so processing block 360 is entered to call for the execution of the guarded program (in this case, the channel switching program pointed to by a payload parameter) as covered by flow diagram 400 of FIG. 4.

With reference to processing block 410, the guarded process is executed—here the result is to overwrite the output port in the look-up table stored in the resource state memory. Accordingly, decision block 415 yields a "NO", but decision block 425 results in a "YES". Moreover, there is no output event generated from the channel switching program, so decision block 435 results in a "NO". Finally, processing by block 445 produces a "YES", whereupon the cell is re-routed to the new output port as determined with reference to the look-up table stored in resource state memory 150.

By way of generalization, it will be readily appreciated by one of ordinary skill in the art that a plurality of programs can be arranged to process a given incoming cell. In such a case, it oftentimes is necessary to activate a guard program to oversee the plurality of programs processing the given cell so as to ensure consistent events and a consistent node state results from the simultaneous execution of the plurality of programs.

Although various embodiments which incorporate the teachings of the present invention have been shown and described in detail herein, those skilled in the art can readily devise many other varied embodiments that still incorporate these teachings.

I claim:

1. A canonical programming method for integrating intelligence into a communications service, the communications service being implemented with a program stored in a processing unit having input and output ports to receive and transmit messages, each message being composed of a control tag and payload information, the method for each port comprising the steps of retrieving a specific message from the port under control of the processing unit, parsing the specific message by the processing unit to determine if the control tag, the payload information, or both is to be modified, if no modification is indicated, transmitting the specific message to one or more ports, and if modification is indicated, further processing the specific message by the program to effect program-generated events and subsequent actions so as to thereby engender the intelligent communications service.

2. The method as recited in claim 1 wherein the processing unit has a program memory and a resource state memory for storing the states of resources serving the processing unit and wherein said step of further processing includes the step of processing the specific message with reference to states of the program memory and the resource state memory.

3. The method as recited in claim 1 wherein the processing unit has a program memory, a resource state memory for storing the states of resources serving the processing unit, and control inputs, and wherein said step of further processing includes the step of processing the message with reference to states of the program memory and the resource state memory and the control inputs.

4. The method as recited in claim 1 wherein the processing unit has a program memory and a resource state memory for storing the states of resources serving the processing unit and further including the steps of downloading another program via one or more of the received messages prior to retrieving the specific message, and wherein said step of further processing the specific message includes the step of executing the program, in conjunction with said another program, in response to the specific message.

5. The method as recited in claim 1 wherein the processing unit has a program memory and a resource state memory for storing the states of resources serving the processing unit, said program memory also storing a guard program and wherein said step of further processing the specific message includes the step of executing the program under control of the guard program to effect consistent states of the program memory and the resource state memory.

6. A canonical programming method for integrating intelligence into a communications service, the method comprising the steps of implementing the communications service with a program stored in a processing unit having a program memory including a program state, a resource state memory for storing the states of resources serving the processing unit, and input/output ports to receive and send messages, respectively, and executing the program in response to a specific message either received by or requested by the program over a corresponding port, said step of executing including the steps of retrieving the specific message, parsing the specific message, determining the program state and the resource state, and processing the specific message with reference to the program state and the resource state by the program to effect program-generated events and subsequent actions so as to thereby engender the communications service.

7. The method as recited in claim 6 further including the steps of downloading and storing another program in the program memory via one or more of the received messages prior to retrieving the specific message.

8. The method as recited in claim 6 wherein said program memory also stores a guard program and wherein said step of executing the program includes the step of executing the program under control of the guard program to effect consistent states of the program memory and the resource state memory.

9. A canonical programming method for integrating intelligence into a communications service, the communications service being implemented with a program stored in a processing unit having input and output ports to receive and transmit messages, each message being composed of a control tag and payload information, the processing unit including a program memory and a resource state memory for storing the state of resources serving the processing unit, the program memory further storing a guard program, the method for each port comprising the steps of (a) retrieving a specific message from the port under control of the processing unit, (b) parsing the specific message by the processing unit to determine if the control tag, the payload information, or both is to be modified, (c) if no modification is indicated, transmitting an output message corresponding to the specific message to one or more other ports and returning to step (a), (d) if modification is indicated, generating an event indicative of the modification, (e) determining if the event requires access to the program memory or the resource state memory, and proceeding to step (g) if no access is required; otherwise, continuing with step (f), (f) executing the guard program to authenticate access to the program memory or the resource state memory, and if not authenticated, returning to step (a); otherwise, continuing with step (g), (g) executing the program, said step of executing including the steps of updating the program memory if required, updating the resource state memory if required, producing a program-generated event if required, and generating an output message corresponding to the specific message if required, and then returning to step (a).

10. A canonical programming system for integrating intelligence into a communications service, the system comprising a processing unit, resources serving the processing unit, input/output ports to receive and send messages, respectively, to and from the processing unit, a program memory including a program state, and a resource state memory for storing the states of resources serving the processing unit, the processing unit being arranged to execute a program stored in the program memory in response to a specific message either received by or requested by the program over a corresponding port, said program causing the processing unit to: (a) retrieve the specific message; (b) parse the specific message; (c) determine the program state and the resource state; and (d) process the specific message with reference to the program state and the resource state to effect program-generated events and subsequent actions so as to thereby engender the intelligent communications service.

* * * * *